US009286706B1

(12) United States Patent
Krishnaswamy et al.

(10) Patent No.: US 9,286,706 B1
(45) Date of Patent: Mar. 15, 2016

(54) EDITING IMAGE REGIONS BASED ON PREVIOUS USER EDITS

(71) Applicant: Google Inc., Mountain View, CA (US)

(72) Inventors: Aravind Krishnaswamy, San Jose, CA (US); David Gary Besbris, Cupertino, CA (US)

(73) Assignee: Google Inc., Mountain View, CA (US)

( * ) Notice: Subject to any disclaimer, the term of this patent is extended or adjusted under 35 U.S.C. 154(b) by 83 days.

(21) Appl. No.: 14/099,745

(22) Filed: Dec. 6, 2013

(51) Int. Cl.
*G06K 9/40* (2006.01)
*G06T 11/60* (2006.01)
*G06K 9/00* (2006.01)

(52) U.S. Cl.
CPC ............ *G06T 11/60* (2013.01); *G06K 9/00221* (2013.01)

(58) Field of Classification Search
CPC ............... G06T 11/60; G06K 9/00221; G06K 9/00228; G06K 9/00288; G06K 9/00281; G06K 9/00248
USPC ......... 382/118, 295, 305, 311, 266, 254, 167, 382/274, 199; 715/202, 231, 255, 223, 723, 715/724, 743; 345/581, 594, 419, 441
See application file for complete search history.

(56) References Cited

U.S. PATENT DOCUMENTS

| 7,065,249 | B2 | 6/2006 | Fushiki et al. | |
|---|---|---|---|---|
| 7,420,594 | B2 | 9/2008 | Yamada et al. | |
| 7,574,016 | B2 | 8/2009 | Steinberg et al. | |
| 7,916,971 | B2 | 3/2011 | Bigioi et al. | |
| 8,379,130 | B2 | 2/2013 | Forutanpour et al. | |
| 8,885,068 | B2* | 11/2014 | Kim et al. | 348/239 |
| 2004/0085324 | A1* | 5/2004 | Yao | 345/581 |
| 2007/0147700 | A1* | 6/2007 | Jeong et al. | 382/266 |
| 2008/0266326 | A1* | 10/2008 | Porwal | 345/659 |
| 2011/0102854 | A1* | 5/2011 | Cho et al. | 358/403 |
| 2012/0081554 | A1 | 4/2012 | Berman et al. | |
| 2014/0153832 | A1* | 6/2014 | Kwatra et al. | 382/195 |

OTHER PUBLICATIONS

Meyer, J., "Adobe Lightroom tutorial: how to save hours of time editing by syncing raw files," Digital Camera World, Furture Publishing Limited, Nov. 24, 2013.
Young, Nicole S., "Plug In with onOne Software: Using Perfect Portrait," Pearson Education, Peachpit, Jan. 7, 2013.
Willis, David, "Mastering Control Points," Digital Photo Magazine, Werner Publishing Corp., Aug. 16, 2011.

* cited by examiner

*Primary Examiner* — Sheela C Chawan
(74) *Attorney, Agent, or Firm* — IP Spring

(57) ABSTRACT

Implementations relate to editing image regions based on previous user edits. In some implementations, a method includes detecting a region depicting an identified subject in a target image and determining an identity of the identified subject. The method retrieves one or more stored user edits associated with the identity of the identified subject, where the user edits were previously made by a user to one or more other regions in one or more source images, and the other regions depict the identified subject having the identity. The method applies the one or more user edits to the region in the target image.

20 Claims, 6 Drawing Sheets

EDITING IMAGE REGIONS BASED ON PREVIOUS USER EDITS

BACKGROUND

The popularity and convenience of digital cameras as well as the widespread of use of Internet communications have caused digital images to become ubiquitous. For example, user-produced digital photographs are posted to various Internet sites, such as web pages, social networking services, etc. for users and others to view. However, many images, such as photographs taken by a camera, can include various features unsatisfying to a user. For example, a face captured in an image may be too bright, have too much contrast, include undesired facial marks, etc. To improve images, a user commonly edit images directly by opening an image in an editor program and manually adjusting various characteristics of particular areas of the image, such as brightness, contrast, saturation, clarity or blurring amounts, etc. in areas such as faces, objects, or distinguishable areas.

SUMMARY

Implementations of the present application relate to editing image regions based on previous user edits. In some implementations, a method includes detecting a region depicting an identified subject in a target image and determining an identity of the identified subject. The method retrieves one or more stored user edits associated with the identity of the identified subject, where the user edits were previously made by a user to one or more other regions in one or more source images, and the other regions depict the identified subject having the individual identity. The method applies the retrieved user edits to the region in the target image.

Various implementations and examples of the method are described. For example, the identity can be an individual identity identifying a particular person, entity, object, or location known via previously-stored information. The identified subject of the target image can be a face associated with an identified person having the individual identity. Other types of subjects can also be identified, such as objects, locations, etc. Applying the user edits can include adjusting the user edits to fit a different position or orientation of the identified subject in the target image as compared to the position or orientation of the identified subject in source images. For example, the user edits can include an indication of relative distances between user edit operations and identified features within the other regions in the source images, and adjusting the user edits can include detecting corresponding identified features in the detected region of the target image and mapping the user edits to the detected region in the target image based on the relative distances. In some examples, the stored user edits can be stored on storage device(s) separately from the source images to which the stored user edits were previously applied.

In some implementations, a single source image can be designated to be the only source of the user edits applied in the target image. In some examples, the user inputs the one or more user edits to the single source image and designates the single source image to provide the one or more user edits, followed by the applying of the user edits in the target image. One or more additional regions depicting the identified subject can be detected in additional target images, and the user edits can be applied to the additional regions in the additional target images. For example, detecting the additional regions in additional target images can be performed for a set of images determined to be similar to the single source image in time of capture and/or depicted subject.

In some implementations, multiple source images can be used, and the applied user edits can be derived from previous user edits made to multiple regions depicting the identified subject in the multiple source images. The applied user edits can be inferred as user-preferred edits based on examining the previous user edits made to the regions in the multiple source images. Inferring the user-preferred edits can include obtaining an average or mean value of the multiple previous user edits; and/or using a regression technique on the previous user edits.

A method includes, in some implementations, detecting a face of an identified person in a target image and retrieving one or more stored user edits associated with the face of the identified person. The user edits were previously made to one or more other faces of the identified person appearing in one or more source images. The method applies the user edits to the face of the identified person in the target image. In various implementations of the method, a single source image can be the only source of the user edits applied in the target image. The method can detect one or more additional faces depicting the identified person in additional target images; and apply the user edits to the additional faces in the additional target images. In some implementations, multiple source images are used, and the applied user edits are derived from previous user edits made to multiple faces depicting the identified person in the multiple source images. The applied user edits can be inferred as user-preferred edits based on examining the previous user edits made to the faces in the multiple source images.

In some implementations, a system can include a storage device and at least one processor accessing the storage device and operative to perform operations. The operations include detecting a region depicting an identified subject in a target image and determining an identity of the identified subject. One or more stored user edits associated with the identity of the identified subject are retrieved, where the user edits were previously made by a user to one or more other regions in one or more source images, and the other regions depict the identified subject having the identity. The user edits are applied to the region in the target image. Various implementations of the system can, for example, have the identity be an individual identity and the identified subject of the target image be a face associated with an identified person having the individual identity. The user edits can be adjusted to fit a different position or orientation of the identified subject in the target image as compared to the position or orientation of the identified subject in at least one of the source images.

DETAILED DESCRIPTION

Figure 1:
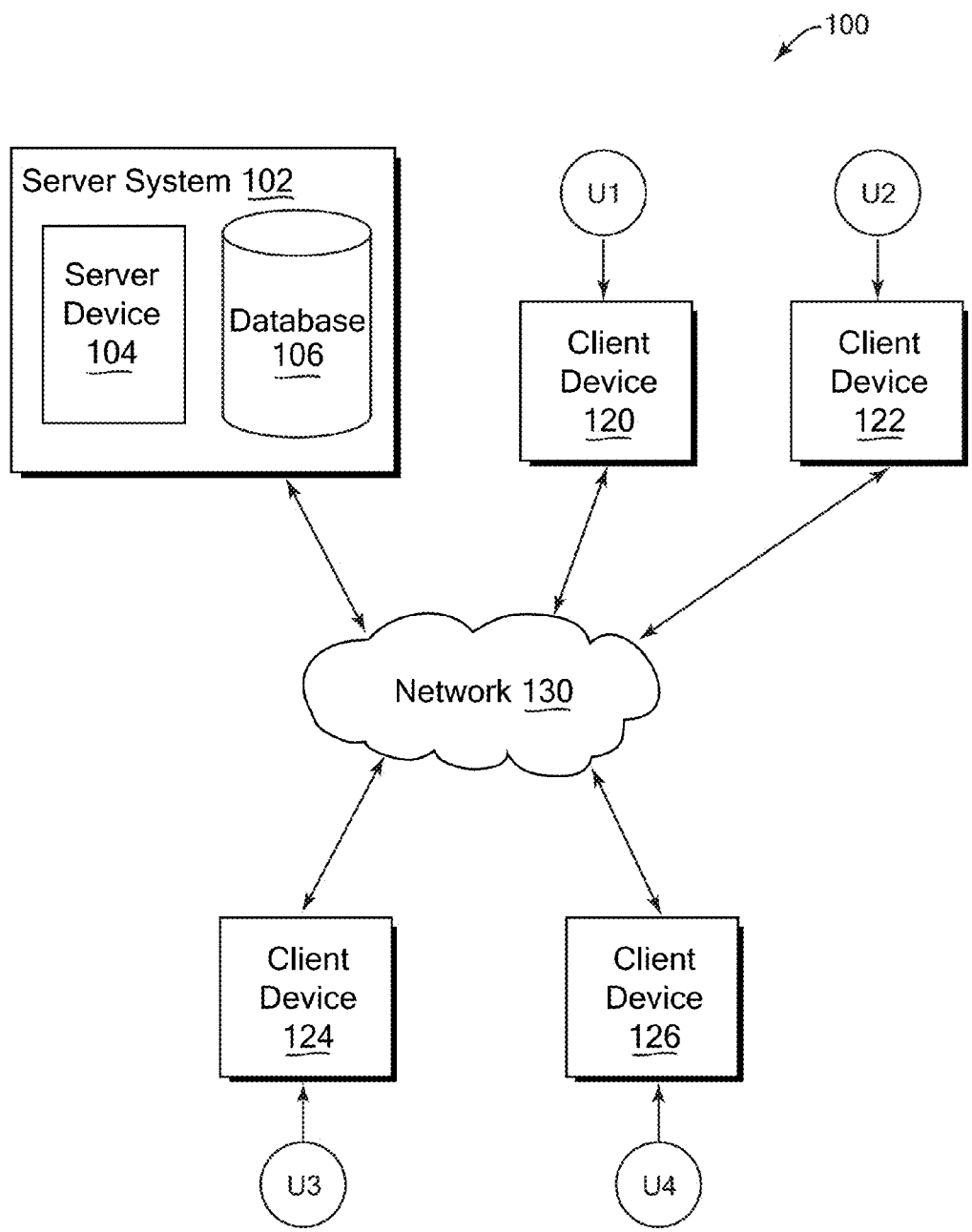
FIG. 1 is a block diagram of an example network environment which may be used for one or more implementations described herein.

One or more implementations described herein relate to editing image regions based on previous user edits. Various implementations allow automatic edits to image regions detected in target images, such as persons' faces or other types of regions. For example, the detected regions depict identified subjects and have recognized identities. The system stores previous user edits made to the same subjects and identities in one or more source images, and applies those same user edits to the detected regions in one or more target images. This allows intelligent application and synchronization of user edits to regions in images depicting common subjects and identities, reducing the need for the user to make individual and repetitive edits in target images. "Intelligent" means that a user edit from a source image may be adjusted before being applied to a target image. For example, if the position of the region depicting the identified subject is different in the source and target image, the position of applying the user edit in the target image is adjusted accordingly. "Synchronizing" user edits between a source image and a target image can refer to the application of user edits to the target image so that the target image has the same user edits as in the source image, although the location of the edits in the target image may be different in an intelligent fashion as noted above.

In example implementations, the system can detect a region depicting an identified subject in a target image, such as a face of a person, an object, or other region, and determines an individual identity of the identified subject, such as the person whose face was detected, a particular identified object, etc. The system retrieves stored user edits associated with the individual identity. The stored user edits were previously made by a user to other regions in one or more source images that depict the identified subject having the individual identity. The edits can include any type of image edits, such as changes in color, saturation, brightness, blurriness, etc. The system applies those stored user edits to the region instance in the target image. Features can include adjusting the user edits to fit a different position or orientation of the identified subject in the target image as compared to the identified subject in the source image(s). For example, the stored user edits can include an indication of relative distances between the locations of user edit operations and identified features (e.g., facial landmarks such as eyes, mouth) in the regions in the source images. The system can detect the same features in the region of the target image and map the user edits to the target region based on the relative distances.

In some implementations, a single source image is designated to be the only source of the stored user edits applied to the detected region in a target image. The system can also identify more regions depicting the identified subject in additional target images and apply the user edits to the regions. In other implementations, the system can apply user edits derived from multiple source images. For example, user-preferred edits can be based on or inferred from multiple previous user edits made to multiple occurrences of the region in multiple source images. Such user-preferred edits can change and adapt over time based on new user edits to source images.

Such features can allow particular user edits to be automatically applied to the same subjects and identities in multiple images, thus saving a user tedious and time-consuming manual editing of those multiple images. For example, after a user makes edits to a particular person's face in one photo, the system can automatically detect the face of that same person in multiple other photos, and can automatically apply the same edits to those faces. In addition, the previous user edits applied to particular regions in an source image (such as faces) can be applied to corresponding regions in target images regardless of whether those regions are in different locations than in the source image with respect to the image borders. Furthermore, users often favor certain kinds of edits for certain kinds of subjects in images, such as a certain kind of filter for a particular person depicted in images (e.g., apply a particular amount of skin softening to one person (e.g. spouse) than to a different person (e.g. sibling)). These edits can be corrective edits or stylistic edits based on the user's personal tastes, and different users may apply different edit operations or different edit values to particular faces. Features herein allow personal preferences or tastes of a particular user to be automatically applied to regions in new images or unedited images for that user.

Since the application of user edits obtained from one or more source images to one or more target images occurs automatically, the effort to repetitively and individually edit each of the one or more target images in the same way is reduced. For example, the duration of editing the one or more target images is shortened, thus saving energy and resources for achieving the edits on a system implementing the image editing method. Consequently, a technical effect is that the process of editing multiple target images is reduced, and at the same time the resources used to achieve the editing of the one or more target images is reduced. A further advantage is that the automated editing of target images based on user edits naturally occurs more uniformly across the target images, thus resulting in more predictable and seamless quality of the resulting images than if the target images were each edited manually.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, laptop computer, portable device, cell phone, smart phone, tablet computer, television, TV set top box or entertainment device, display glasses or goggles, wristwatch, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a social network service implemented on server system 102, where respective client devices 120, 122, 124, and 126 transmit communications and data to one or more server systems such as system 102, and the server system 102 provides appropriate data to the client devices such that each client device can receive content uploaded to the social network service via the server system 102. In some examples, the social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat or teleconferencing with other users of the service, etc. As used herein, the term "social networking service" can include a software and/or hardware system that facilitates user interactions, and can include a service implemented on a network system.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations of features described herein can use any type of system and service. For example, any type of electronic device can make use of features described herein. Some implementations can provide these features on client or server systems disconnected from or intermittently connected to computer networks. In some examples, a client device having a display screen can display images and provide features and results as described herein that are viewable to a user.

Figure 2:
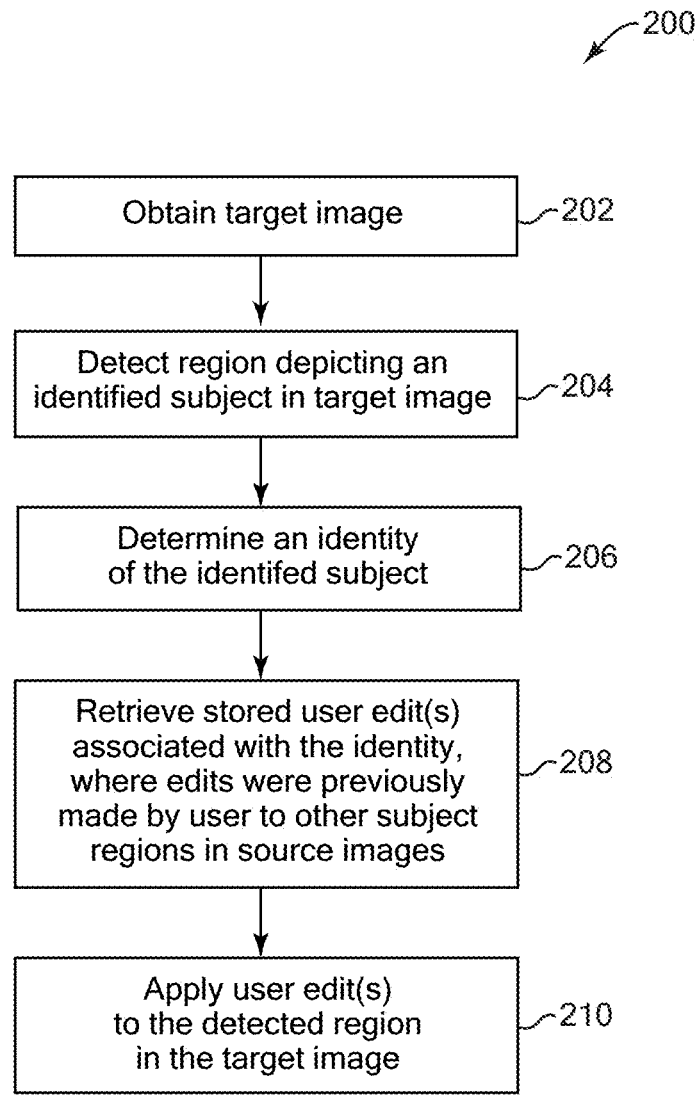
FIG. 2 is a flow diagram illustrating an example method for editing image regions based on previous user edits, according to some implementations.

FIG. 2 is a flow diagram illustrating one example of a method 200 for editing image regions based on previous user edits. In some implementations, method 200 can be implemented, for example, on a server system 102 as shown in FIG. 1. In other implementations, some or all of the method 200 can be implemented on a system such as one or more client devices, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200. Method 200 can be implemented by computer program instructions or code, which can be executed on a computer, e.g., implemented by one or more processors, such as microprocessors or other processing circuitry, and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software. The method 200 can be performed as part of or component of an application running on the system, or as an application or software running in conjunction with other applications and operating system.

In some implementations, method 200 is initiated based on user input. A user may, for example, have selected the initiation of the method 200 from a graphical user interface such as an application interface, a social networking interface, or other interface. In other implementations, the method 200 can be initiated automatically by a system. For example, the method 200 can be periodically performed, or performed based on one or more particular events or conditions such as a user completing editing an image, receiving one or more original images that have been newly uploaded to or accessible by the system. In some implementations, such conditions can be specified by a user in custom preferences of the user. In one non-limiting example, a camera, cell phone, or other client device can capture one or more images and can perform the method 200 to process the images. In addition or alternatively, the client device can send images to a server over a network, and the server can process the images using method 200.

In block 202 of method 200, the method obtains a target image for processing. The image can be a digital image composed of multiple pixels, for example, and can be stored on one or more storage devices of the system or otherwise accessible to the system, such as a connected storage device, e.g., a local storage device or storage device connected over a network. For example, the image can be a photo captured by a camera or can be derived from a different source. In some implementations, a user can provide or designate one or more images to process as target images. In other implementations, the target image can be automatically selected by the method, e.g., as an image from an album or other collection of multiple images, such as an album provided in an account of a user of a social networking system, and/or as an image that has been edited by a user as described below. In some examples, the system can determine which image to obtain as a target image based on evaluating one or more characteristics of accessible images, such as the color distributions of images, timestamps and other metadata of images, and/or identified and recognized content depicted in the images, such as persons, faces, or objects, some examples of which are further described below.

In block 204, the method detects a region depicting an identified subject in the target image. The region is a portion or sub-area of the target image including a number of pixels, for example. The identified subject depicted in the region can be a variety of different types of subjects and can be detected using any of a variety of techniques. In some examples or implementations, one type of detected identified subject can be faces of people, and can be detected based on looking for facial features such as eyes, nose, mouth, eyebrows, etc. Individual facial features themselves can also be identified subjects in some implementations. In some other examples, the type of identified subject can be an object, or more specific types of objects can be, for example, vehicles (car, truck, boat, etc.), articles or items (bottle, pen, phone, chair, etc.), or buildings or other structures. Such objects can be detected using techniques that search for features unique to such objects, such as particular shapes, proportions, colors, brightnesses, surrounding features in the image, etc. In some other examples, the type of identified subject can be an area, location, or landscape feature, such as a sky or portion thereof, a mountainside, foliage (e.g., tree or group of trees, an area covered by grass, etc.), a lake, a river, etc., and can be detected using techniques searching for features unique to such features, such as color, texture, location in the image (e.g., a sky region being at the top of the image), relation to other detected features, etc.

In block 206, the method determines an identity of the identified subject in the target image. In some implementations, the identity can be an individual identity that identifies a particular known person (or other entity, e.g., animal), object, or location, e.g., such as a particular instance of the identified subject, which is known via previously stored information such as one or more images, descriptive data or database, and/or other data. For example, the identity can be a known identity associated with the identified subject which distinguishes the instance of the identified subject found depicted in the detected region from any other instances of the identified subject. For instance, if the detected region is a face, the identity can be a name or other identifier of the person whose face is depicted, which distinguishes the detected face from faces of other persons that can be detected. In some implementations, the identity can be a real name or handle of the person whose face is depicted. In other implementations, the identity need not be a real name of the depicted person, and need only be an identifier internally used by the method or system to identify this particular face and person. For example, the identity can be "User1" that is associated with particular facial features (a facial signature) and can be identified as the person whose face is detected in the target image and other images. In another example, if the detected region is an object, the identity can be a known identifier associated with that instance or brand of object, such as "Bob's car" as an identifier for a particular detected vehicle known to be owned by a user "Bob" based on previous data such as user data or previously-tagged or -labelled images or video (or other content) having description information that associates this object with a user, etc. In another example, if the detected region is a location, such as a particular depicted patch of sky, the identity can be an identifier such as "Sky3" that identifies this particular view and portion of sky, and which may be known by it appearing and being previously detected in other (source) images based on particular cloud formations or based on location next to other identified persons or objects.

In block 208, the method retrieves one or more stored user edits associated with the identity determined in block 206. These user edits were previously made by the user to one or more other regions (e.g., not the detected region detected in block 204) in one or more source images, where the one or more other regions depict the same identified subject having the identity as found in the target image as described above. The user edits can include edit operations that perform one or more modifications or adjustments to one or more characteristics of a source image, such as brightness, color, saturation, clarity/blurriness, modifications made in a particular pattern or template, etc., and were made to one or more pixels of the other regions in the one or more source images. In some implementations, the stored user edits also include associated edit information, such as edit location points and/or other locations referring to locations where the edit operations were made in the source images, and/or relative distances between the edit locations and one or more features in the source images, such as facial features of a face.

In block 210, the method applies the retrieved user edits to the detected region in the target image. For example, the same adjustments to image characteristics that were made to the one or more regions in the source image(s) are made to the detected region in the target image. In some implementations, associated edit information such as edit location and relative distances can allow user edits in one region location of the source image (relative to the image frame) to be mapped to a different region location in the target image, examples of which are described in greater detail below.

Thus, the method allows previous, stored user edits to the same type of region subject having the same identity in other images to be automatically applied to new target images in an efficient manner, without the user having to repetitively individually edit each target image in the same way. Previous user edits applied to a particular region of previous images can be mapped to the same type and identity of region in the target image that has a different location relative to the frame or borders of the target image.

Figure 3:
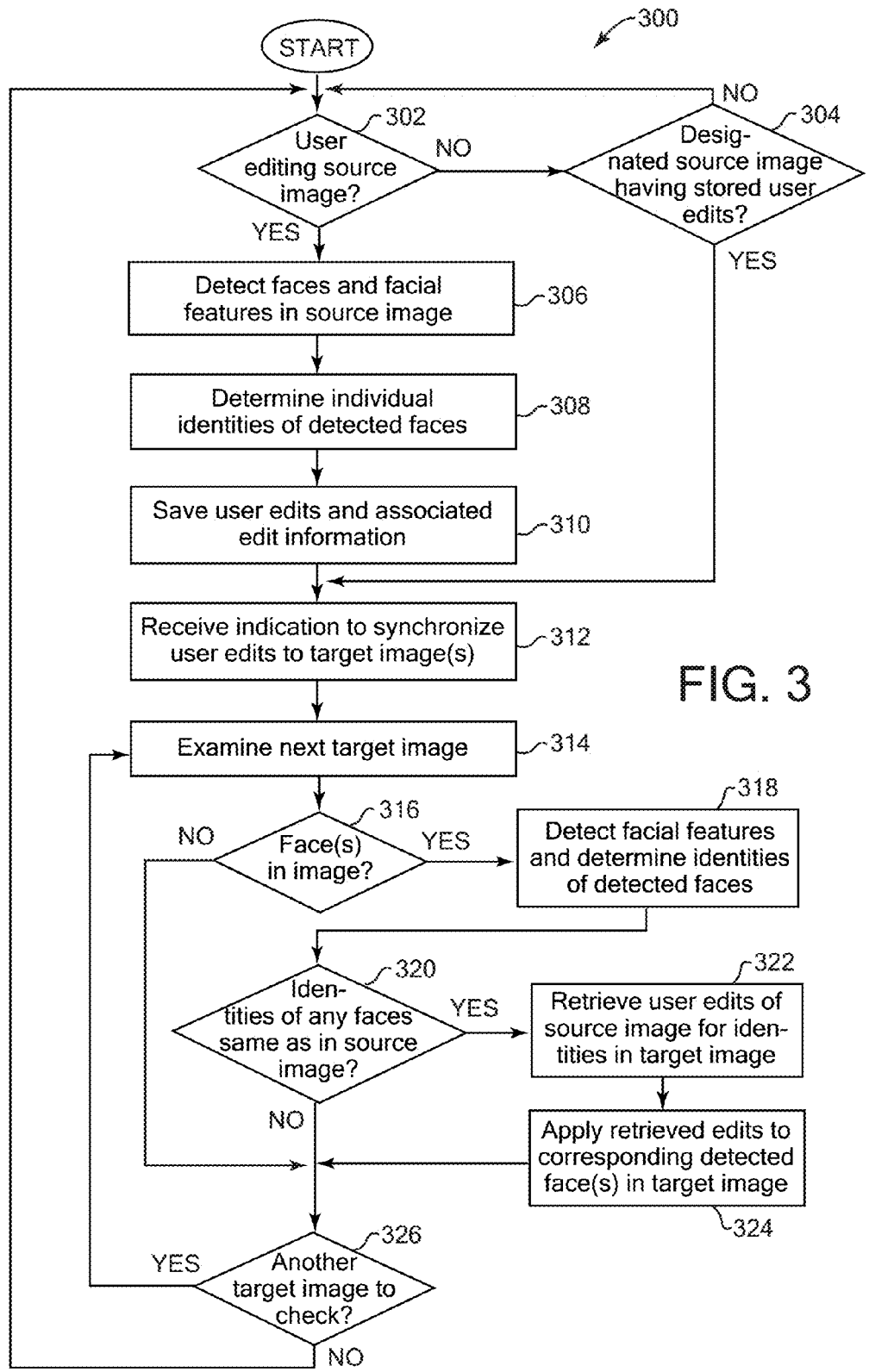
FIG. 3 is a flow diagram illustrating an example method for editing image regions based on previous user edits from a single previously-edited source image, according to some implementations.

FIG. 3 is a flow diagram illustrating an example method 300 for editing image regions based on previous user edits, according to some implementations. In method 300, the edits determined for a target image are based on previous user edits from a single previously-edited source image. Method 300 can be implemented by a system such as a server and/or client device as described above for method 200. For explanatory purposes, in this example the identified subjects of the detected regions in the images are faces of persons. Other types of image subjects can be used with method 300 as described herein, and appropriate processing of such subjects can be performed similarly to the processing of face subjects described below.

In block 302, the method checks whether the user is editing an image, which is designated as a source image in this example. For example, in some cases or implementations, the user may command to open an editing application to edit an image, or may edit an image in another program or using a function of an operating system. If the user is not editing an image, then the method continues to block 304, which checks whether a source image has been designated that has stored user edits. For example, such a source image can be designated by a user, or can be designated and selected by the method based on predetermined conditions or events, as described above. For example, the user or method can select a previously edited image from an image album or other storage source, such as any image available to a user which has been edited at a previous time by the user. If no such source image is designated, the method returns to block 302. If such a source image is designated, then the method continues to block 312, described below. In some implementations, just the stored user edits made to a source image can be designated, without the source image itself being designated, e.g., in implementations where the user edits are stored and identified separately from the source image to which they were applied. Such separate storing and identification of user edits may be arranged for example in server system 102 in combination with a database 106, where the server system may identify for a given image (e.g., using metadata of the given image) associated edits which a user made to the given image at a previous time. In other implementations, storing and identification of user edits can be provided on a client device using storage (memory, hard drive, etc.) local to the client.

If the user is editing a source image as checked in block 302, then blocks 306-310 can be performed before, during, and/or after such user editing. In block 306, the method detects one or more faces and facial features in the source image (assuming that one or more faces are depicted in the source image; if not, the method can return to block 302). For example, any of a number of well-known facial detection and recognition techniques can be used to detect whether one or more faces are present in the image. In some of these techniques, for example, facial features can be looked for in the image, such as eyes, mouth, nose, and eyebrows in particular spatial configurations. Both faces and their facial features can be detected in block 306.

In block 308, the method determines an individual identity for each of the detected faces (blocks 306 and 308 can also be performed simultaneously). For example, an individual identity can be an identifier for the person whose face is depicted in the image. In some implementations, this identifier can be a name of the person, such as a formal name used in real life activities, or a user name used as an alias in online activities or other specialized activities. For example, in some implementations, the method 300 has access to social data of a social networking service, including the user names of users of the service. The method can take the facial and facial feature data from block 306 and search images of users that are stored for the social networking service for a match to find the individual identity (e.g., user name) associated with a particular face. Other identity data can be searched in other implementations. In some implementations, no actual name, user name, or other external identifying information is known about persons being identified, and an identifier internal to method 300 can be used that associates faces with a particular person. For example, an individual identity designated as "User21" can be associated with particular facial features found in the source image, and can be identified as the identity (person) whose face is detected in the source image.

In block 310, the method receives and saves user edits made by the user to one or more face regions of the source image. For example, the user edits can be stored as metadata of the source image. In some implementations, user edits may be stored with the source image, or alternatively can be stored separately from the source image. Such edits can include edit operations that change edit operation values, where the edit operations are modifications or adjustments to one or more characteristics of the pixels of a region. For example, such adjustments can include changes of values of pixel brightness, color, saturation, clarity/blurriness, etc. (for example, using values in a color model such as RGB (red, green, blue), HSV (hue, saturation, value), etc.). For examples, a skin smoothing edit operation can be used to blur pixels in the image and thus smooth out undesirable features in a person's face, such as wrinkles, skin pores, scars, or other perceived imperfections in a person's face (or smooth out features in other types of image subjects). Other edit operations can change the color or brightness of the eyes or teeth of a face, remove noise, enhance contrast, sharpen lines, etc. A stored user edit can store the particular edit operation(s) performed (e.g., change of brightness, change of color, blur over a grid of predetermined number of pixels), as well as the value(s) to which the characteristics are changed (e.g., changing brightness from 40 to 60).

The stored user edits also can include associated edit information related to the user edit operations. For example, in some implementations, the associated edit information includes edit location points which indicate particular locations associated with the user edit operations. In one example, a user makes an edit to the color of a group of pixels. An edit location point is stored, which in some implementations can be the coordinates of one or more of those pixels relative to a facial bounding box surrounding the detected face, where the facial bounding box can be defined by the facial features (e.g., the box can be defined by the outer eyebrow points and lower extreme mouth points, as with example facial bounding box 516 in FIG. 5). In some implementations, information can also be stored which describes the number and/or configuration of pixels that were changed. Pixel coordinates of changed pixels can be stored according to a predetermined method which allows the exact locations to be determined of all changed pixels relative to edit location points and/or a facial bounding box. For example, the center pixel of an edited group of pixels can be stored, which in combination with description information, allows the precise user edit operation to be recorded.

In some implementations, the associated edit information can include relative distance information indicating image distances between edit location points and detected facial features of the modified face region (or between the edit location points and other detected features of a non-facial region). For example, a user edit to the nose of the face may have an edit location point centered on the nose location of the face. The distances from this edit location point to the eyes and to the mouth of that face, and/or the position of the edit location point relative to the eyes and mouth, can be saved as associated edit information (e.g., using coordinates). In some implementations, the relative distances can be equivalently stored as an x-y location of the edit location point within a facial bounding box space as described above, or an x-y location within a different defined image space. This allows a user edit to be mapped to other faces of the same person having different locations and/or orientations in a target image by locating the facial features in the target image, as described below. After block 310, the method can continue to block 312.

In some implementations, an edit location point can designate a particular location (such as a pixel) that the user has marked as a reference point. The user or system can also specify a particular radius or pixel range for the edit location point, and associate one or more edit operations and changed values to the edit location point. The system can then find all pixels or features similar in color (or other characteristic such as texture) to the marked pixel and change the similar pixels according to the associated edit operations. For example, if a user puts an edit location point within a facial bounding box on the facial skin area of the face, then the system changes all skin pixels of that face within the radius according to the associated editing operation(s). If the edit location is within a facial feature such as an eye or mouth, then only that facial feature itself (and any others of that type of facial feature within the radius) is edited by the editing operation(s).

In block 312, the method (optionally) receives an indication to synchronize the edits of the source image to one or more target images, e.g., to apply the edits of the source image to one or more target images. In some implementations, the source image is the image that the user edited during blocks 306-310. For example, after editing the source image in blocks 306-310, the user can select the edited image as the source image for block 312. In other implementations, the source image can be a different image, e.g., the image designated in block 304. In some examples, the user can input a command to the system to perform the synchronization, which can occur at any time. In other implementations or modes of operation, the method 300 can automatically determine to perform the synchronization. For example, the method can determine to perform the synchronization after the method determines that the user has finished editing the source image. In various implementations, user preferences can indicate to perform the synchronization periodically, at particular predetermined times, immediately after edits occur to the source image (e.g., during blocks 306-310), after receiving one or more new images from other users, systems, or storage devices, and/or upon some other predetermined conditions or events occurring.

The particular target image(s) on which to perform the synchronization can be determined in any of several ways. For example, the user can explicitly select or otherwise indicate the target images. In another implementation, the method can automatically search for candidate target images from a group of stored images. For example, the method can search for images that are similar in one or more characteristics to the source image, and those images having at least a threshold similarity (sufficient similarity) can be considered target images. Similarity can be determined in any of a number of ways. For example, the method can check for temporal similarity, such that images having a time of capture (or time of storage) within a predetermined time window of the time of capture (or storage) of the source image can be considered sufficiently similar. In some implementations, visual characteristics of images can be examined for similarity to visual characteristics of the source image. For example, images depicting one or more subjects, such as faces, persons, objects, or locations, that are also depicted in the source image can be considered sufficiently similar. The method can examine images as to whether they have a similar overall color scheme, brightness, color cast, and/or other characteristics to those of the source image. Images found to be sufficiently similar are considered to be the target images for synchronization of the user edits.

In some implementations, the method can search for images that do not yet have any user edits applied to them, while images that already have user edits are disqualified from being target images. In other implementations, the method can search for images that may have had some user edits applied but do not have the particular user edits that were applied to the source image, and/or do not have edits similar to the user edits that were applied to the source image. In one example, similar edits can be edits applying the same edit operations that adjust pixel values within a predetermined threshold amount of each other. Such search options can also be selected by the user, e.g., in user preferences.

In block 314, the method selects and examines the next target image. In block 316, the method checks whether the selected target image depicts one or more faces. If not, the method continues to block 326 to check for another target image. If one or more faces are depicted, then in block 318 the method detects facial features of the depicted faces and determines individual identities for the depicted faces. This process can be similar to that described in block 306 and 308.

In block 320, the method checks whether any of the determined individual identities of the detected faces in the target image are the same identities found for the user edits made to the source image. If none of the identities in the target image are the same as in the source image, then the method continues to block 326 to check for another target image.

If one or more of the identities are the same in the target image as in the source image, then in block 322, the method retrieves the user edits of the source image that are associated with the same individual identities as found in the target image. In block 324, the method applies the retrieved user edits to the appropriate corresponding detected faces in the target image. For example, if two faces were found in the target image to have the same individual identities as corresponding faces found in the source image, then the user edits associated with these two identities in the source image are retrieved and applied to their respective associated faces in the target image.

Associated edit information can be used to apply the edits properly to the faces in the target image. For example, edit locations and relative distances between edit location points and facial features (and/or x-y location within a facial bounding box) in the source image are examined in the associated edit information, and the distances and locations are used to determine where the associated edit operations are to be applied in the target image via determined edit location points that are spaced from corresponding detected facial features in the target image. In some cases, applying the one or more user edits includes adjusting the user edits to fit a different position or orientation of the identified face in the target image as compared to the position or orientation of the identified face in the source image. For example, if the detected face in the source image is directly facing the viewer (0 degrees of rotation) and the same person's face in the target image is rotated 20 degrees to one side, then the user edits are adjusted accordingly to occur between corresponding facial features that will be rotated in the target image.

In block 326, the method checks whether there is another target image to synchronize with edits from the source image. For example, the user may have indicated multiple target images, or the method may have determined there is another target image to check based on image characteristics being similar to the source image. If there is another target image to check, the method returns to block 314. If there are no further target images to check, the method returns to block 302.

Various implementations can include variations of above features. For example, non-facial subjects depicted in image regions, such as objects (articles, items, landmarks, etc.), areas or locations can be detected in images and their identities determined based on one or more other regions depicting the identified subject in the source image. For example, a particular instance of a subject in a previous (e.g., source or non-source) image may have had its features recorded and an identifier assigned to it, such as "Sky1" to a particular depicted patch of sky having particular cloud features, surrounding terrain features, etc. This same patch of sky can be identified in a target image by looking for and comparing the same features recorded from the previous image and identifying that same patch of sky.

Figure 4:
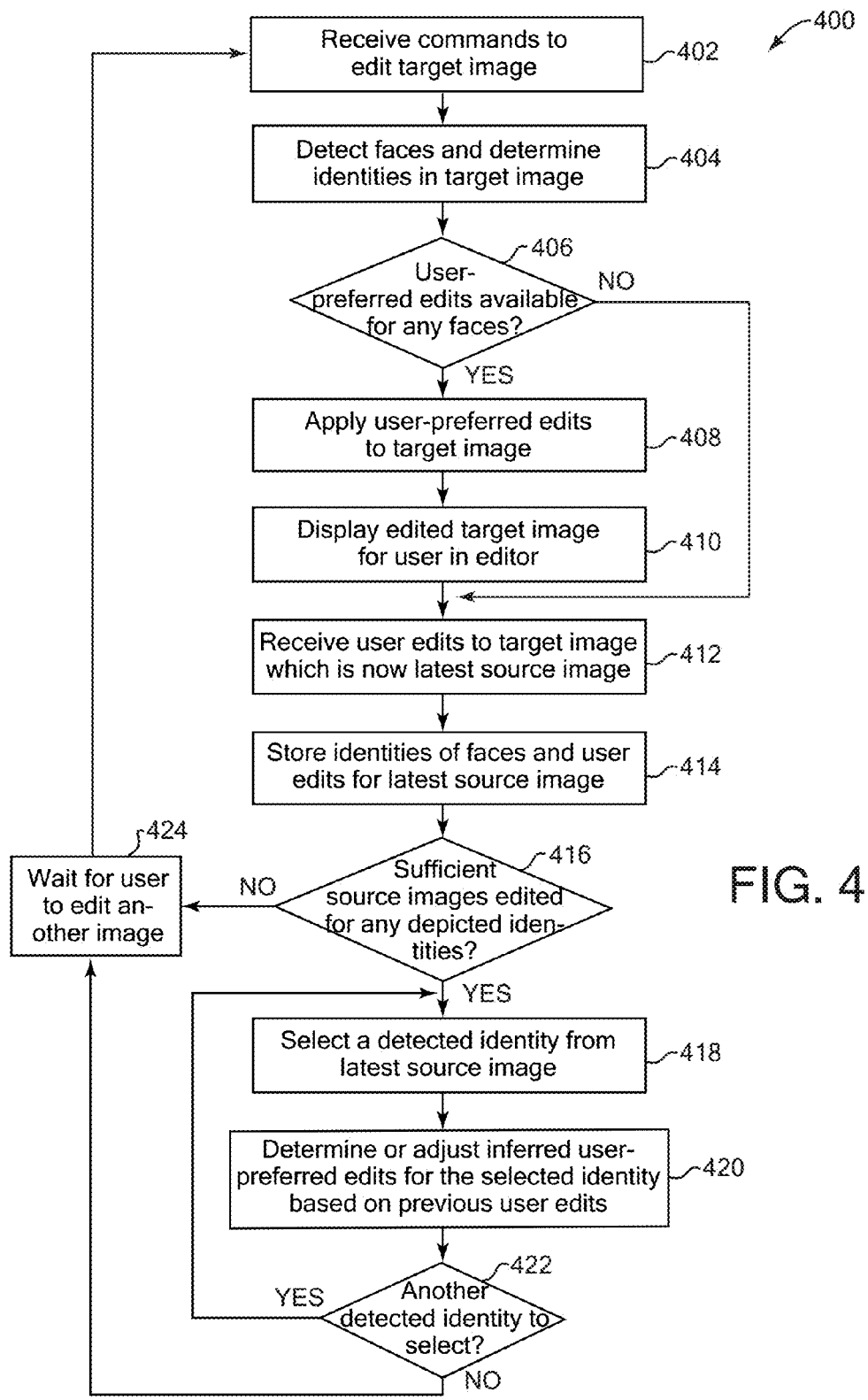
FIG. 4 is a flow diagram illustrating another example method for editing image regions based on previous user edits from multiple previously-edited source images, according to some implementations.

FIG. 4 is a flow diagram illustrating an example method 400 for editing image regions based on previous user edits, according to some implementations. In method 400, the edits determined for a target image are based on user edits from multiple previously-edited source images. Method 400 can be implemented by a system such as a server and/or client device as described above for method 200. For explanatory purposes, in this example the identified subjects of the detected regions in the images are faces of persons similarly as described above for FIG. 3, but other types of depicted subjects can be identified and processed in other implementations similarly as described elsewhere herein.

In block 402, the method receives commands to open an image to edit. In this method, the opened image is (initially) considered a target image. Similarly as described above, the image can be opened in response to a user selecting the image to edit and sending a command to open the image, or the system can open the image automatically based on user preferences, commands from another system, etc.

In block 404, the method detects one or more faces in the target image and determines individual identities associated with the detected faces. The method can detect the faces using one or more facial recognition techniques, as described above with reference to FIG. 3. The individual identities can be identifiers identifying persons whose faces are depicted, as described above with reference to FIG. 3.

In block 406, the method checks whether there are inferred user-preferred edits available for any of the detected faces. Such user-preferred edits are stored user edits associated with particular individual identities (e.g., persons), which have been inferred by method 400 based on multiple previous user edits as described below with reference to block 420. In some cases, there may be no user-preferred edits available for a particular individual identity, e.g., if the method has not inferred any such user edits because there have been no previous user edits associated with that individual identity, or because there have not been a sufficient number of previous images edited by the user that depict a face of that individual identity. Thus, if there are no user-preferred edits available for any of the detected faces in the target image, the method continues to block 412, described below.

If there are user-preferred edits available for one or more of the detected faces, then in block 408 the method applies the relevant user-preferred edits to the target image. The user-preferred edits can be similar to stored user edits as described above with reference to FIG. 3, and can include one or more edit operations as well as associated edit information such as relative distance between edit location points and facial features. The user-preferred edits are applied to their associated faces similarly as described above for FIG. 3. For example, if one detected face in the target image is determined to have an individual identity of User1, and a set of user-preferred edits are found to be stored and available for User1, then that set of edits is applied to that detected face in the target image using associated edit information to provide the edits at the proper location in the target image relative to the image frame/borders. In some implementations, the user-preferred edits are automatically applied to the target image in block 408. In other implementations, the user can be prompted to confirm whether the user-preferred edits should be applied, e.g., after being presented a displayed preview of the edited image.

In block 410, the method displays the edited target image for the user, e.g., in an editor application or other application. For example, the edited target image can be displayed in a graphical user interface of a client device or server device. Thus, the target image is displayed to the user with user-preferred edits already applied. This allows the user to immediately start editing an image already having edits that are the same or similar to edits that the user has applied previously to the same person's face in other images.

In block 412, the user edits the target image (if applicable). For example, if block 412 is being performed after block 406, then edits are typically made since no user-preferred edits were applied. If block 412 is being performed after block 410 where user-preferred edits were automatically applied and displayed, the user may or may not perform edits. For example, if the user-preferred edits applied to the target image in block 408 are satisfactory to the user, the user need only save the edited target image without applying any additional edits. If the user wants to further edit the target image, then the applied edits can act as an editing starting point for the user, thus often saving the user time in determining baseline values for editing. In some implementations, if the user does not like the user-preferred edits applied to the target image in block 408, the user can undo those edits so that the original target image is displayed and can be edited from that state. After the user finishes editing the target image, the method continues to block 414. In the example method 400, this target image is now considered a source image which is the "latest source image" to be edited in method 400.

In block 414, identities and user edits made to the latest source image in block 412 are stored. For example, a set of user edits can be stored for each individual identity having a face edited in the source image. The user edits can include the edit operations performed on those faces and associated edit information for those faces, similarly as described for FIG. 3. The stored user edits can include any user-preferred edits applied to the image initially in block 408 so that the total change in edit values relative to the original target image are stored. The user edits are stored to be associated with the individual identities whose faces received the edit operations. In some implementations, if an individual identity has been edited by the user in one or more previous source images, those user edits are already stored and this new set of user edits can be stored alongside or in the same data structure as the previous user edits.

Block 416 can be implemented after block 414 as shown in FIG. 4, and/or can be performed at various other times or in response to other events or conditions occurring (e.g., based on user preferences, receiving a new image, etc.). In block 416, the method checks whether a sufficient number of source images have been edited by the user with respect to any of the individual identities detected in the latest source image edited in block 412. This condition is checked as a prerequisite to determine user-preferred edits with regard to those individual identities as described below. For example, the method checks whether there are a sufficient number of sets of stored previous user edits (each set derived from a different source image) to determine user-preferred edits that can be automatically applied in new images (as in block 408, described above). In some examples, the greater the number of sets of user edits that have been made for particular identity, the closer the method can get to estimating user-preferred edits that the user desires for that identity. Conversely, the fewer the sets of previous user edits made to faces of an identity, the less data the method has to work with to estimate user-preferred edits for that identity. Thus, if there are not a sufficient number of edited source images (including any user edits made to the source image in block 412) in block 416, the method continues to block 424, detailed below.

If there are a sufficient number of source images having user edits for one or more individual identities depicted in the source image, then in block 418 the method selects an individual identity having a face depicted in the source image, where that identity is associated with a sufficient number of previously edited source images. For example, if the source image depicts faces of User1, User2, and User3, but only User2 and User3 have sufficient previously edited source images, then User1 is ignored and User2 or User3 can be selected in block 418.

In block 420, the method determines or adjusts user-preferred edits for the selected individual identity. This set of user-preferred edits will be applied to any face belonging to that individual identity which is detected in a new image examined by method 400. The method can determine new user-preferred edits if no user-preferred edits already exist for a particular identity, or the method can adjust existing user-preferred edits based on the new user edits from the latest source image (e.g., the edits obtained in block 412).

In various implementations, a number of different methods or techniques can be used to determine or adjust user-preferred edits. In one example, the method can average (or take the mean value of) corresponding previous user edits to obtain a user-preferred edit. For instance, if a first previous user edit adjusted the brightness of a person's face in a first source image to a value of 80, and a second previous user edit adjusted the brightness of that person's face in a second source image to a value of 100, then the user-preferred value is determined to be the average of these values, which is 90. In other implementations, the user-preferred edit can be the minimum edit value of all the corresponding previous user edits, to (for example) automatically start user-preferred edits to a new image in a conservative way and thus allow the user to edit the image further if desired. The user-preferred edits can have edit locations that are averaged location values based on the locations in each of the source images relative to the borders of the facial bounding box, for example. In addition, relative distances between edit location points and facial features can be similarly averaged and stored in the user-preferred edits.

In other examples, more complex techniques can be used to determine user-preferred edits. For example, a learning model can use regression techniques to find a user-preferred edit operation values (and/or edit location points and relative distances) based on multiple different previous user edit values. In some example implementations, the method can make a histogram of the pertinent values of the pixels of each face in each edited source image, and can estimate a resultant value based on the histogram values using regression and/or other techniques (mean values, etc.). For example, a histogram of hues can be made for each face, and resultant values determined for each predetermined range of hues. In some implementations, particular previous edit operation values can be assigned a greater weight than other previous edit values in the determination of the user-preferred edits, e.g., based on one or more characteristics of the source images of those edit values. For example, edit values from more recently captured or stored source images can be given greater weight then edit values from older source images.

In one particular example, User1 likes to edit images that depict User2 and User3. User1 prefers heavy skin softening on the face of User2, and prefers little softening on the face of User3. Thus, in a few source images, User1 sets the skin softening amount to 70% on a User2's face and to 10% on User3's face. After a sufficient number of source images have been edited depicting User2's face and Users3's face (in this example, always skin-softened to 70% and 10%, respectively), user-preferred edits can be determined for User2 and User3. The user-preferred value for User2's face is 70% and for User3's face is 10%. Edit location points and relative distances can also be stored, e.g., as averaged locations and distances from the edit locations and distances of the source images.

In block 422, the method checks whether there is another detected identity to process in the latest source image edited in block 412. If so, the method returns to block 418 to select another detected identity. If there are no additional detected identities to process, or if there are insufficient edited source images for detected identities, then the method continues to block 424. In block 424, the method waits for the user to edit another image. If the method receives commands to edit another image, the method returns to block 402.

Thus, the method can employ a training system that uses previous examples of edits to infer user-preferred edits that can be applied to new images, where the greater the number of source images used to provide sets of user edits, the better the method can infer the user-preferred edits. Over time, as additional images are edited by the user and become source images, the user-preferred edits are adjusted based on the total user edits that include these new user edits, and the user-preferred edits become more suited to the taste of the user. Thus, editing of target images can require less additional editing by the user, since multiple various relevant user edit samples contribute to the applied user-preferred edits instead of one sample. If a user changes his or her preference in how the user edits particular faces over time, the method adapts to these new preferences since the user-preferred edits will eventually incorporate and reflect the new edits made by the user.

A reason for combining two or more user edits to provide a user-preferred edit is that the application of the user-preferred edit to a target image can more likely result in a satisfactory and appealing result in a high quality image than if the user edits are applied to the image individually or separately, or if only a subset of the user edits are applied. The technical effect of deriving user-preferred edits is to improve the method and to use less resources in applying user edits to one or more target images.

In some implementations, the method can automatically apply the user-preferred edits determined in block 420 to one or more new images obtained by the system. For example, the method can examine each new image obtained by the system, can determine whether any individual identity is depicted for which user-preferred edits are available, and can apply available user-preferred edits. User preferences can dictate which images can be automatically processed, such as images obtained within a specified time period, depicting particular identities or other subjects, and/or meeting other conditions.

Various blocks and operations of methods 200, 300, 400 can be performed in a different order than shown and/or at least partially simultaneously, where appropriate. For example, some implementations can perform blocks 416-422 at various times or based on events not related to a user editing an image. Some implementations can perform blocks 402-412 at least partially simultaneously with other blocks such as blocks 414 and/or block 416-424. In some implementations, blocks or operations of methods 200-400 can occur multiple times, in a different order, and/or at different times in the methods. In some implementations, the methods 200, 300, and/or 400 can be implemented, for example, on a server system 102 as shown in FIG. 1. In some implementations, one or more client devices can perform one or more blocks instead of or in addition to a server system performing those blocks.

Figure 5:
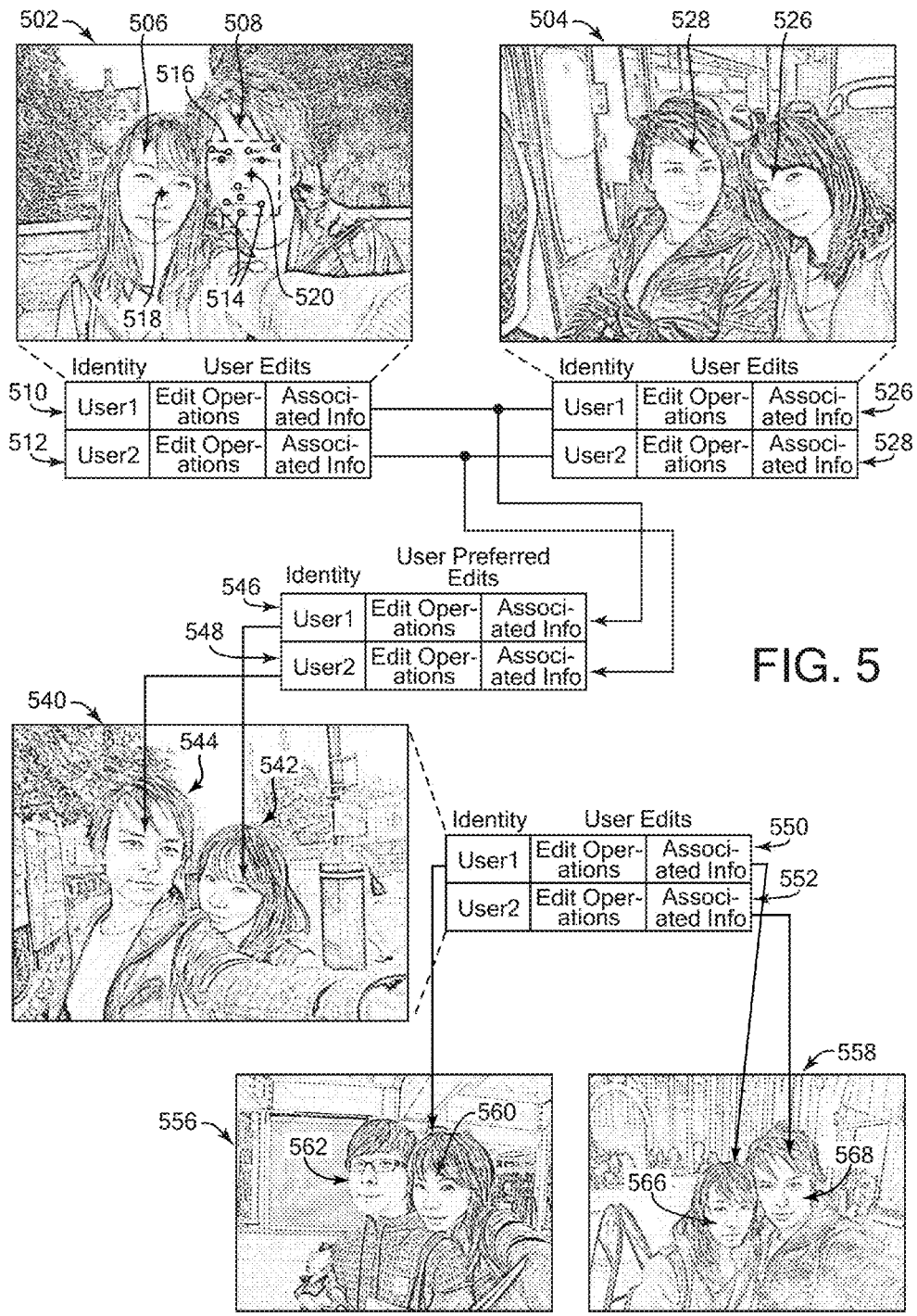
FIG. 5 is a diagram illustrating example implementations of the methods of FIGS. 3 and 4.

FIG. 5 is a diagram illustrating example implementations of the methods of FIGS. 3 and 4. Various images are shown in FIG. 5. In some implementations or applications, the images and stored user edits can be received from a variety of sources, such as memory, storage drives, or other storage associated with a particular user (e.g., on one or more client and/or server devices), and can be stored in a variety of formats, such as images in the user's photo albums, image frames in a movie or other video sequence, etc. The images can be processed as described below by a client or server device. In some implementations, one or more of the images can be displayed on a display device, e.g., of a client device 120, 122, 124, and/or 126 of FIG. 1, or of a server system 102 in some implementations. In one non-limiting example, the user can view one or more of the images displayed by a display device in a graphical interface provided by a client device or server device.

In some implementations, all of the images and stored user edits described in this example are associated with (e.g., owned by or performed by) a particular user, e.g., stored on a particular user's account on a system. This allows the personal editing preferences of that user to be used in automatically editing other images owned or controlled by that user. Other users can similarly have their own user edits and images stored for their own use. Other implementations can share images and/or user edits with multiple users. In one example, a second user can view a first user's stored user edits to the face of a person, and can designate to the system that those edits are also acceptable to the second user. Those first user edits and their images can then be applied, and/or used as source images, for the second user's images which depict that person's face.

With respect to an example using the method of FIG. 4, images 502 and 504 are stored images that have been previously edited by a user. For example, in image 502, edits were made by the user to the face 506 of a User1 and to the face 508 of a User2. These user edits include, for this example, a skin softening operation on each of the faces, such as a heavy skin softening on face 506 and a lighter skin softening on face 508. In another example, the user edits also include a brightening of face 508. These user edits can be stored in available storage space (e.g., with their images or separately) and are associated with the recognized individual identities associated with the faces. For example, user edits 510 are stored for an identified identity "User1" and user edits 512 are stored for an identified identity of "User2." These identities have been associated with the faces 506 and 508 by using facial recognition techniques. For example, facial features can be detected in the faces, as indicated by the example of facial feature points 514 in face 508. Example facial feature points 514 mark the extent or center of particular detected facial features, such as eyebrows, eyes, nose, and mouth, from which a facial bounding box 516 can be determined and an associated identity recognized. The identities "User1" and "User2" can be actual names used by the persons whose faces are depicted in the image 502, or can be identifiers having no connection to real names and which are used by the system for identifying identities to which faces belong.

In this example, the user edits 510 and 512 include the edit operations performed and can include associated edit information including edit locations. In this example, edit locations can be edit location points designated on the image 502 from which particular user edits are associated. For example, edit location point 518 is located on face 506, and an edit location point 520 is located on face 508. In some implementations, an edit location point can be defined by a location with respect to a facial bounding box such as box 516 and by a radius which indicates the amount of the image around the edit location point to analyze for editing. For example, the image area within the radius can be examined for pixels having a specified color (or color range or other characteristic) or a color that is the same as the pixel or region of the location point, and such pixels will be edited with any edit operations associated with the edit location point. In one example, the skin softening and brightening edit operations described above can be applied to pixels having a facial skin color and are within a specified radius of the edit location point 520. In some implementations, the associated edit information of each user edit 510 and 512 can include information such as relative distance between the edit location point 520 and facial location points 514.

Image 504 depicts faces 526 and 528 that are recognized to be associated with the same user identities "User1" and "User2", respectively, as the faces 506 and 508 shown in image 502. User edits 526 and 528 have been made by the user and stored for image 504 for those individual identities, similarly as edits 510 and 512 for image 502.

As described above with respect to FIG. 4, user-preferred edits can be determined based on previous user edits to multiple source images. These user-preferred edits can be determined based on a variety of events or conditions occurring, such as in response to a user editing a new image as described in FIG. 4. In this example, the user commands to open image 540 to edit that image. This causes the system to check if user-preferred edits are available to automatically be applied to target image 540, e.g., as a starting point for user editing.

For example, the system can detect the faces 542 and 544 in image 540 and recognizes that these faces belong to the individual identities "User1" and "User2." The system then checks whether there are user-preferred edits available for one or both of those identities. In this example, the user-preferred edits 546 and 548 have previously been determined and are stored and available for the identities "User1" (face 542) and "User2" (face 544), respectively. These user-preferred edits were inferred based on previous user edits to faces for those identities in source images, which in this case are user edits 510 and 526 in source image 502 for the face of User1, and the user edits 512 and 528 in source image 504 for the face of User2.

Thus, the user-preferred edits 546 for User1 can be automatically applied to face 542 in target image 540, and the user-preferred edits 548 for User2 can be automatically applied to face 544 in target image 540. The system can use the edit locations and any other associated edit information of the user-preferred edits 546 and 548 to locate where the edits should be positioned in image 540, e.g., so that the radius of the edit location points are properly placed and the user preferred edits properly applied to the faces 542 and 544 even though those faces are not in the same locations in image 540 as in images 502 and 504 relative to the image frame. The edited target image 540 can then be presented to the user as an initial image in the editor, which the user can then edit further if desired.

In the example of FIG. 5, the user performs additional edits to the face 544 and does not edit the face 542 any further. The edits performed to image 540 are stored similarly as for images 502 and 504, where user edits 550 and 552 describe the edits performed to faces 542 and 544, respectively. In the case of User1 (face 542), the user edits 550 are the same as user-preferred edits 546, since no further user edits were applied to face 542 in image 540. For User2 (face 544), the user edits 552 include the additional user edits made by the user to face 544.

In some implementations as described in FIG. 4, the system can update the user-preferred edits for User1 and User2 based on user edits made to image 540. In this example, only the user-preferred edits 548 for User2 would be updated, since no additional edits were made to the face of User1. In a case in which no user-preferred edits had been available to apply to image 540, after the edits are made to the image 540, the system can check whether a sufficient number of images have now been edited for User1 and/or User2 to cause the system to determine user-preferred edits.

In an example using the method 300 of FIG. 3, the user then instructs the system to synchronize the user edits 550 and 552 of image 540 (now used as a source image) to one or more target images. For example, the user (or preferences) can specify that any other (unedited) images of the user that were captured or stored at a similar time that the image 540 was captured are to be considered target images. The system searches available images, such as images stored in one or more albums of the user on one or more client and/or server devices.

In this example, the system finds target images 556 and 558, which have time stamps within a predetermined threshold time period of the time stamp of the image 540, and which have no user edits applied them. The system also has found at least one face in each of the target images 556 and 558 that has the same individual identity as at least one face in the image 540. For example, in target image 556, face 560 belongs to the same individual identity User2 as the face 542 in source image 540. The system does not recognize face 562 as belonging to either User1 or User2. In target image 558, the system recognizes that faces 566 and 568 belong to the user identities User1 and User2, respectively, as detected in source image 540.

The system then applies appropriate user edits to one or more faces in the found target images. For example, the system applies user edits 550 from source image 540 to face 560 of target image 556, using the associated edit information from edits 550. The system also applies edits 550 to face 566 of target image 558. Finally, the system applies edits 552 to face 568 of target image 558.

In some implementations, non-facial features can also or alternatively be processed by features described herein. For example, a particular object in the image 540 can be recognized and its identity determined, such as a particular user coat or other article of clothing, monument or building in the background, etc., and previous user edits associated with this object identity can be retrieved and applied to the image 558. Similarly, a sky or foliage region of the image 502 can be recognized and previous edits made to the same or similar sky or foliage regions can be applied to the sky or foliage in image 540 if the same identity can be recognized in image 540.

Figure 6:
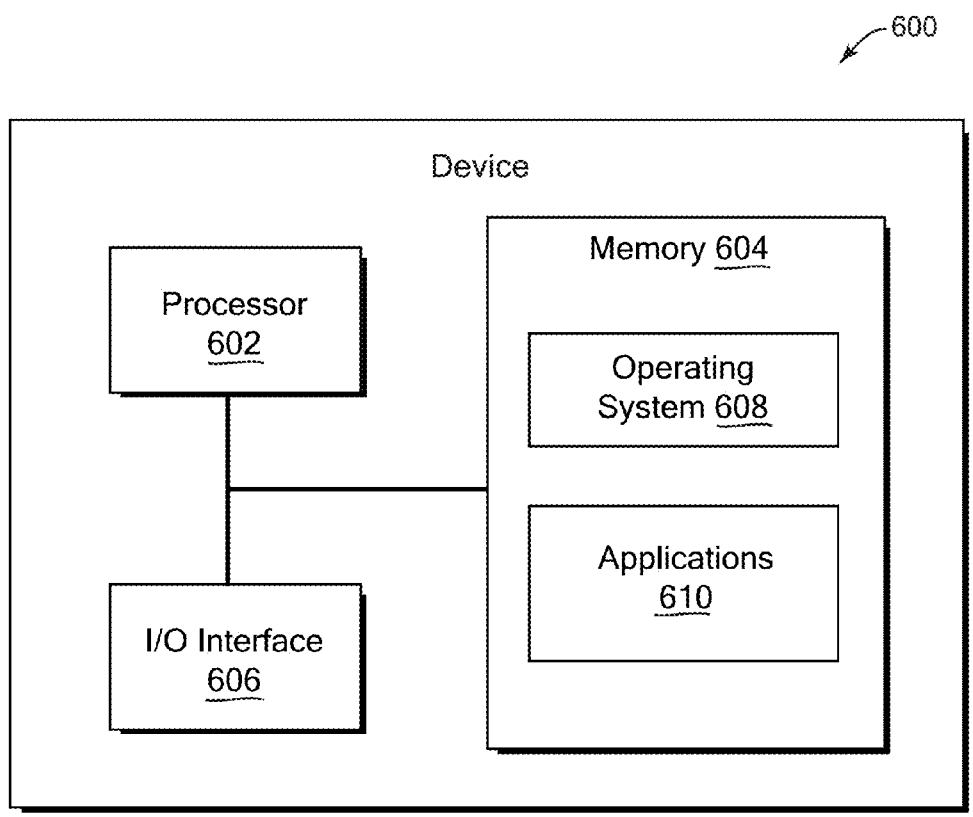
FIG. 6 is a block diagram of an example device which may be used for one or more implementations described herein.

FIG. 6 is a block diagram of an example device 600 which may be used to implement one or more features described herein. In one example, device 600 may be used to implement server device 104 of FIG. 1, and perform appropriate method implementations described herein. Device 600 can be any suitable computer system, server, or other electronic or hardware device. For example, the device 600 can be a mainframe computer, desktop computer, workstation, portable computer, or electronic device (portable device, cell phone, smart phone, tablet computer, television, TV set top box, personal digital assistant (PDA), media player, game device, etc.). In some implementations, device 600 includes a processor 602, a memory 604, and input/output (I/O) interface 606.

Processor 602 can be one or more processors or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the device 600 by the processor 602, including an operating system 608 and one or more applications engines 610 such as a graphics editing engine, web hosting engine, social networking engine, etc. In some implementations, the applications engines 610 can include instructions that enable processor 602 to perform the functions described herein, e.g., some or all of the methods of FIGS. 2, 3, and/or 4. Any of software in memory 604 can alternatively be stored on any other suitable storage location or computer-readable medium. In addition, memory 604 (and/or other connected storage device(s)) can store images, information describing identities, user edits associated with identities and/or images, and other data used in the features described herein. Memory 604 and any other type of storage (magnetic disk, optical disk, magnetic tape, or other tangible media) can be considered "storage devices."

I/O interface 606 can provide functions to enable interfacing the device 600 with other systems and devices. For example, network communication devices, storage devices such as memory and/or database 106, and input/output devices can communicate via interface 606. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 600, such as processor(s) 602, memory 604, and I/O interface 606. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text and/or describes settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A computer-implemented method comprising:
   detecting a region depicting an identified subject in a target image;
   determining an identity of the identified subject;
   retrieving one or more stored user edits associated with the identity of the identified subject, wherein the one or more user edits were previously made by a user to one or more other regions in one or more source images, the one or more other regions depicting the identified subject having the identity, wherein the one or more user edits include one or more edit operations that were previously applied to the one or more other regions in the one or more source images to change one or more pixels in the one or more source images;
   applying the one or more user edits to the region in the target image by applying the one or more edit operations to change one or more pixels in the target image.

2. The method of claim 1 wherein the identity is an individual identity identifying a particular person or other entity, object, or location known via previously-stored information, and wherein the identified subject of the target image is a face associated with an identified person having the individual identity.

3. The method of claim 1 wherein the stored user edits include one or more edit operation values used by the one or more edit operations to change the pixels in the source image, wherein the one or more edit operations are applied to change the one or more pixels in the target image using the one or more edit operation values.

4. The method of claim 1 wherein applying the one or more user edits includes adjusting the one or more user edits to fit a different position or orientation of the identified subject in the target image as compared to the position or orientation of the identified subject in at least one of the one or more source images.

5. The method of claim 4 wherein the one or more user edits include an indication of relative distances between one or more edit location points of at least one of the edit operations and identified features within the one or more other regions in the one or more source images, and wherein adjusting the one or more user edits includes detecting corresponding identified features in the detected region of the target image and mapping the one or more user edits to the detected region in the target image based on the indication of relative distances.

6. The method of claim 1 wherein the one or more edit operations previously applied to the one or more other regions in the one or more source images changed at least one of: a color, a brightness, a contrast, a saturation, and a blurriness of the one or more pixels in the one or more source images.

7. The method of claim 1 wherein the one or more stored user edits include associated edit information used in the previous application of the one or more edit operations to the one or more regions in the one or more source images, wherein applying the one or more user edits to the region in the target image includes applying the one or more edit operations using the associated edit information to change the one or more pixels in the target image, wherein the associated edit information includes location information related to a location of application of the one or more edit operations relative to one or more detected features in the one or more source images.

8. The method of claim 1 wherein the one or more stored user edits indicate associated edit information used in the previous application of the one or more edit operations to the one or more regions in the one or more source images, wherein applying the one or more user edits to the region in the target image includes applying the one or more edit operations using the associated edit information to change the one or more pixels in the target image, wherein the associated edit information includes at least one of:
   distance information indicating one or more distances between one or more edit location points and one or more detected features in the one or more other regions;
   one or more edit location points and information indicating which pixels relative to the one or more edit location points were changed by the one or more edit operations in the one or more source images.

9. The method of claim 1 wherein the one or more source images are a single source image designated to be the only source of the one or more user edits applied in the target image, wherein the one or more user edits were applied to the single source image and the single source image is designated to provide the one or more user edits, followed by the applying of the one or more user edits in the target image, the method further comprising:
   detecting one or more additional regions depicting the identified subject in additional target images; and
   applying the one or more user edits to the one or more additional regions in the additional target images.

10. The method of claim 9 wherein detecting the one or more additional regions in additional target images includes:
    determining the additional target images as a set of images that is similar to the single source image in at least one of: time of capture, and depicted subject matter.

11. The method of claim 1 wherein the one or more source images are multiple source images, and the applied one or more user edits are derived from multiple previous user edits made to multiple regions depicting the identified subject in the multiple source images.

12. The method of claim 11 wherein at least one of the applied one or more user edits are inferred as user-preferred edits based on examining the multiple previous user edits made to the multiple regions in the multiple source images.

13. The method of claim 12 wherein the inferred user-preferred edits are determined based on at least one of:

obtaining a mean value of the multiple previous user edits; and using a regression technique on the multiple previous user edits.

14. A computer-implemented method comprising:

detecting a face of an identified person in a target image;

determining that one or more stored user edits are associated with the face of the identified person, the one or more stored user edits including:

one or more edit operations that were previously applied to one or more faces of the identified person appearing in one or more source images, and associated location information related to a location of application of the one or more edit operations in the one or more source images relative to one or more detected features in the one or more source images; and applying the one or more edit operations to the face of the identified person in the target image to change one or more pixels in the target image using the associated location information.

15. The method of claim 14 wherein the stored user edits include associated edit information used by the one or more edit operations to change the pixels in the source image, wherein the associated edit information includes at least one of:

one or more edit operation values used by the one or more edit operations to change one or more color values of pixels of the face in the target image; and location information related to a location of application of the one or more edit operations relative to one or more detected features in the one or more source images, wherein the location information is used in the applying of the one or more edit operations to the target image.

16. The method of claim 14 wherein the one or more source images are multiple source images, and the applied one or more user edits are derived from multiple previous user edits made to multiple faces depicting the identified person in the multiple source images.

17. The method of claim 16 wherein the applied one or more user edits are inferred as user-preferred edits based on examining the multiple previous user edits made to the multiple faces in the multiple source images.

18. A system comprising:

a storage device; and at least one processor accessing the storage device and operative to perform operations comprising:

detecting a region depicting an identified subject in a target image;

determining an identity of the identified subject;

retrieving stored previous user edits associated with the identity of the identified subject, wherein the previous user edits were previously made by a user to other regions in a plurality of source images, the other regions depicting the identified subject having the identity; and applying one or more target user edits to the region in the target image to change one or more pixels in the target image, wherein the one or more target user edits are derived from the previous user edits.

19. The system of claim 18 wherein the identity is an individual identity and wherein the identified subject of the target image is a face associated with an identified person having the individual identity.

20. The system of claim 18 wherein at least one of the one or more target user edits are inferred user-preferred edits determined based on examining the previous user edits made to the other regions in the plurality of source images.

* * * * *